(12) United States Patent
Suzuki et al.

(10) Patent No.: US 10,230,606 B2
(45) Date of Patent: Mar. 12, 2019

(54) ROUND-TRIP DELAY TIME MEASUREMENT SYSTEM, ROUND-TRIP DELAY TIME MEASUREMENT METHOD, RETURN METHOD, COMMUNICATION DEVICE, PROGRAM, AND DATA STRUCTURE

(71) Applicant: NEC CORPORATION, Tokyo (JP)

(72) Inventors: Motohiro Suzuki, Tokyo (JP); Kanako Anetai, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/524,085

(22) PCT Filed: Nov. 12, 2015

(86) PCT No.: PCT/JP2015/081876
§ 371 (c)(1),
(2) Date: May 3, 2017

(87) PCT Pub. No.: WO2016/080280
PCT Pub. Date: May 26, 2016

(65) Prior Publication Data
US 2017/0353372 A1    Dec. 7, 2017

(30) Foreign Application Priority Data
Nov. 19, 2014   (JP) .................................. 2014-234691

(51) Int. Cl.
*H04L 12/26* (2006.01)
*H04L 12/805* (2013.01)

(52) U.S. Cl.
CPC .......... *H04L 43/0864* (2013.01); *H04L 43/10* (2013.01); *H04L 47/36* (2013.01)

(58) Field of Classification Search
CPC ...... H04L 43/0864; H04L 47/36; H04L 43/10
See application file for complete search history.

(56) References Cited

U.S. PATENT DOCUMENTS 6,545,979 B1    4/2003  Poulin
9,031,095 B2 *  5/2015  Sagarwala ............ H04J 3/0667
                                                    370/503

FOREIGN PATENT DOCUMENTS

JP    2002-199009 A    7/2002
JP    2005-033499 A    2/2005
(Continued)

OTHER PUBLICATIONS

K. Hedayat et al., "A Two-Way Active Measurement Protocol", Oct. 2008, Internet :<https://tools.ietf.org/html/rfc5357>, pp. 1-26.
(Continued)

*Primary Examiner* — Gbemileke J Onamuti
(74) *Attorney, Agent, or Firm* — Sughrue Mion, PLLC

(57) ABSTRACT

A communication device performs communication with an external device. The communication device includes: a measurement packet transmission unit that transmits a measurement packet at a first transmission time point; a return packet reception unit that receives a return packet at a second reception time point, the return packet being transmitted at a second transmission time point, the return packet including information relating to a processing time indicating a duration from a first reception time point at which the measurement packet is received by the external device, to the second transmission time point, the return packet having a same packet size as the measurement packet; and a delay time specification unit that specifies, as a round-trip delay time, a duration obtained by subtracting the processing time from a duration from the first transmission time point to the second reception time point.

6 Claims, 8 Drawing Sheets

(56) References Cited

FOREIGN PATENT DOCUMENTS

| JP | 2005-184580 A | 7/2005 |
| JP | 2011-142622 A | 7/2011 |
| RU | 2304364 C2 | 8/2007 |

OTHER PUBLICATIONS

International Search Report for PCT/JP2015/081876 dated Jan. 19, 2016.
S. Shalunov et al., "A One-way Active Measurement Protocol (OWAMP)", RFC4656, Sep. 2006, XP015047408, Total 56 pages.
Communication dated Nov. 15, 2017, from European Patent Office in counterpart application No. 15860251.6.
Communication dated Jun. 6, 2018 from the Russian Patent and Trademark Office in counterpart application No. 2017116748/08.

\* cited by examiner

| PACKET NUMBER | PACKET SIZE | TRANSMISSION INTERVAL | RECEPTION INTERVAL | TRANSMISSION TIME POINT | RECEPTION TIME POINT |
|---|---|---|---|---|---|
| 1 | | | | | |
| 2 | | | | | |
| 3 | | | | | |
| 4 | | | | | |
| ⋮ | | | | | |
| N | | | | | |

ND-TRIP DELAY TIME
MEASUREMENT SYSTEM, ROUND-TRIP
DELAY TIME MEASUREMENT METHOD,
RETURN METHOD, COMMUNICATION
DEVICE, PROGRAM, AND DATA
STRUCTURE

CROSS REFERENCE TO RELATED APPLICATIONS

This application is a National Stage of International Application No. PCT/JP2015/081876 filed Nov. 12, 2015, claiming priority based on Japanese Patent Application No. 2014-234691 filed Nov. 19, 2014, the contents of all of which are incorporated herein by reference in their entirety.

TECHNICAL FIELD

The present invention relates to a round-trip delay time measurement system, a round-trip delay time measurement method, a return method, a communication device, a program, and a data structure.

BACKGROUND ART

The spread of services that utilize networks has been accompanied by an increasing demand for facility improvements of networks to be carried out such that the quality state of a network is confirmed, and service users are able to comfortably utilize a service. Indexes that confirm the quality state of a network include, for example, a usable bandwidth, a round-trip delay time, a packet loss rate, and fluctuation of a packet arrival interval.

In Patent Document 1, disclosed is a technique that confirms a usable bandwidth of a network. Specifically, according to the technique disclosed in Patent Document 1, a usable bandwidth is estimated by transmitting from a transmission side a plurality of measurement packets (packet train) having a gradually increasing or decreasing packet size at a fixed transmission interval, and then comparing the transmission interval to a reception interval on a reception side. However, the usable bandwidth is the only index that can be estimated by the technique disclosed in Patent Document 1, and it is not possible to measure a round-trip delay time.

In Patent Document 2, disclosed is a technique that calculates a usable bandwidth and a round-trip delay time as a result of a packet train making a round-trip between two communication devices. Furthermore, in Patent Document 3, disclosed is a technique that calculates a round-trip delay time based on a transmission time point and a reception time point of a measurement packet, and a transmission time point and a reception time point of a return packet.

PRIOR ART DOCUMENTS

Patent Documents

[Patent Document 1] Japanese Unexamined Patent Application, First Publication No. 2011-142622
[Patent Document 2] Japanese Unexamined Patent Application, First Publication No. 2002-199009
[Patent Document 3] Japanese Unexamined Patent Application, First Publication No. 2005-033499

SUMMARY OF THE INVENTION

Problem to be Solved by the Invention

In Patent Document 2, a generation timing is not specified for the packet train used on the inbound path. Consequently, in a case where a round-trip delay time is calculated based on the technique disclosed in Patent Document 2, a delay representing the amount of tune from an outbound path packet train being received to an inbound path packet train being transmitted becomes included in the calculation result of the round-trip delay time. The delay thereof may include, for example, the time required to generate an inbound path packet train, and the time required to specify a reception time point.

That is to say, according to the technique disclosed in Patent Document 2, there is a possibility that the round-trip delay tune is unable to be accurately calculated.

According to the technique disclosed in Patent Document 3, a round-trip delay time is calculated based on a transmission time point and a reception time point of a measurement packet, and a transmission time point and a reception time point of a return packet. Consequently, the calculated round-trip delay time does not include a delay representing the amount of time from the reception of the measurement packet to the transmission of the return packet. However, according to the technique disclosed in Patent Document 3, the return packet is generated by means of the reception terminal appending to the measurement packet received from the transmission terminal a reception time point of the measurement packet and a transmission time point of the return packet. As a result, the packet sizes of the measurement packet and the return packet differ. That is to say, the transmission terminal measures the round-trip delay time based on packets having different packet sizes on the outbound path and the inbound path. Consequently, according to the technique disclosed in Patent Document 3, there is a possibility that the round-trip delay time is unable to be accurately calculated.

An exemplary object of the present invention is to provide a round-trip delay time measurement system, a round-trip delay time measurement method, a return method, a communication device, a program, and a data structure that solve the problem described above.

Means for Solving the Problem

A round-trip delay time measurement system according to a first exemplary aspect includes a first communication device and a second communication device. The first communication device includes: a measurement packet transmission unit that transmits a measurement packet at a first transmission time point; a return packet reception unit that receives a reply packet at a second reception time point, the reply packet including information relating to a processing time indicating a duration from a first reception time point to a second transmission time point, the reply packet having a same packet size as the measurement packet; and a delay time specification unit that specifies, as a round-trip delay time, a duration obtained by subtracting the processing time from a duration from first transmission time point to the second reception time point. The second communication device includes: a measurement packet reception unit that receives the measurement packet at the first reception time point; a processing time specification unit that specifies the information relating to the processing time; a return packet generation unit that generates the return packet; and a return packet transmission unit that transmits, at the second transmission time point, the return packet as a reply to the measurement packet.

A round-trip delay time measurement method according to a second exemplary aspect includes: transmitting a measurement packet at a first transmission time point; receiving the measurement packet at a first reception time point; specifying information relating to a processing time indicating a duration from the first reception time point to a second transmission time point; generating a reply packet that includes the information relating to the processing time and has a same packet size as the measurement packet; transmitting, at the second transmission time point, the return packet as a reply to the measurement packet; receiving the return packet at a second reception tune point; and specifying, as a round-trip delay time, a duration in which the processing time is subtracted from a duration from the first transmission time point to the second reception time point.

A communication device according to a third exemplary aspect performs communication with an external device. The communication device includes: a measurement packet transmission unit that transmits a measurement packet at a first transmission time point; a return packet reception unit that receives a return packet at a second reception time point, the return packet being transmitted as a reply to the measurement packet at a second transmission time point by the external device, the return packet including information relating to a processing time indicating a duration from a first reception time point at which the measurement packet is received by the external device, to the second transmission time point, the return packet having a same packet size as the measurement packet; and a delay time specification unit that specifies, as a round-trip delay time, a duration obtained by subtracting the processing time from a duration from the first transmission time point to the second reception time point.

A round-trip delay time measurement method according to a fourth exemplary aspect includes: transmitting a measurement packet at a first transmission time point; receiving a reply packet at a second reception time point, the reply packet being transmitted as a reply to the measurement packet at a second transmission time point, the replay packet including information relating to a processing time indicating a duration from a first reception time point at which the measurement packet is received, to the second transmission time point, the reply packet having a same packet size as the measurement packet; and specifying, as a round-trip delay time, a duration obtained by subtracting the processing time from a duration from first transmission time point to the second reception time point.

A program according to a fifth exemplary aspect causes a computer to execute: transmitting a measurement packet at a first transmission time point; receiving the measurement packet at a first reception time point; specifying information relating to a processing time indicating a duration from the first reception time point to a second transmission time point; generating a reply packet that includes the information relating to the processing time and has a same packet size as the measurement packet; transmitting, at the second transmission time point, the return packet as a reply to the measurement packet; receiving the return packet at a second reception time point; and specifying, as a round-trip delay time, a duration in which the processing time is subtracted from a duration from the first transmission time point to the second reception time point.

A communication device according to a sixth exemplary aspect includes: a measurement packet reception unit that receives, at a first reception time point, a measurement packet used for calculating a round-trip delay time; a processing time specification unit that specifies information relating to a processing time indicating a duration from the first reception time point to a transmission time point; a return packet generation unit that generates a reply packet, the reply packet including the information relating to the processing time and having a same packet size as the measurement packet; and a return packet transmission unit that transmits, at the transmission time point, the return packet as a reply to the measurement packet.

A return method according to a seventh exemplary aspect includes: receiving, at a first reception time point, a measurement packet used for calculating a round-trip delay time; specifying information relating to a processing time indicating a duration from the first reception time point to a transmission time point; generating a reply packet, the reply packet including the information relating to the processing time and having a same packet size as the measurement packet; and transmitting, at the transmission time point, the return packet as a reply to the measurement packet.

A program according to an eighth exemplary aspect causes a computer to execute: receiving, at a first reception time point, a measurement packet used for calculating a round-trip delay time; specifying information relating to a processing time indicating a duration from the first reception time point to a transmission time point; generating a reply packet, the reply packet including the information relating to the processing time and having a same packet size as the measurement packet; and transmitting, at the transmission time point, the return packet as a reply to the measurement packet.

A data structure according to a ninth exemplary aspect includes information relating to a processing time indicating a duration from a time point at which a measurement packet used for calculating a round-trip delay time is received, to a time point at which a return packet used as a reply to the measurement packet is transmitted. The data structure has a same packet size as the measurement packet.

A data structure according to a tenth exemplary aspect includes a payload portion including: information relating to a time point at which a measurement packet used for calculating a round-trip delay tune is transmitted; information relating to a processing time indicating a duration from a tune point at which the measurement packet is received to a time point at which a return packet used as a reply to the measurement packet is transmitted; and padding data having a same size as a size obtained by subtracting, from a payload length of the measurement packet, a size of information relating to the time point at which the return packet is transmitted, and a size of information relating to the processing time.

Effect of the Invention

According to at least one exemplary aspect among the exemplary aspects described above, a return packet includes information relating to a processing time indicating the duration from a time point at which a measurement packet is received to a transmission time point of the return packet, and the packet size of the return packet is equal to the packet size of the measurement packet. Consequently, a communication device is able to accurately measure a round-trip delay time.

EMBODIMENTS FOR CARRYING OUT THE INVENTION

Prior to description of specific exemplary embodiments, a summary of an exemplary embodiment is described.

Figure 1:
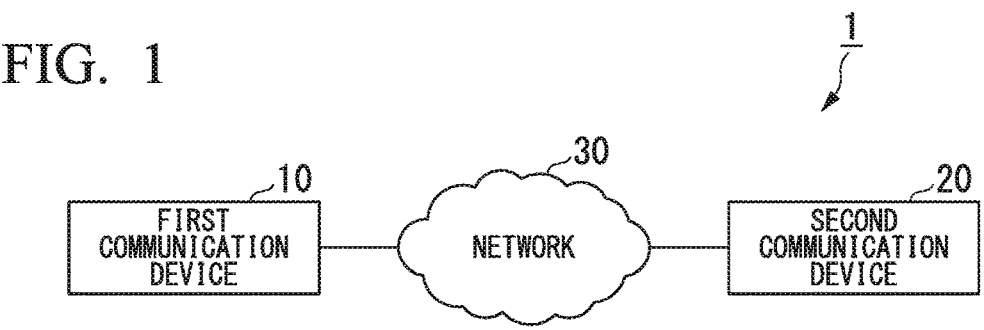
FIG. 1 is a schematic block diagram showing a basic configuration of a round-trip delay time measurement system according to an exemplary embodiment of the present invention.

FIG. 1 is a schematic block diagram showing a basic configuration of a round-trip delay time measurement system 1. The round-trip delay time measurement system 1 includes a first communication device 10 and a second communication device 20. The first communication device 10 and the second communication device 20 are connected via a network 30.

Figure 2:
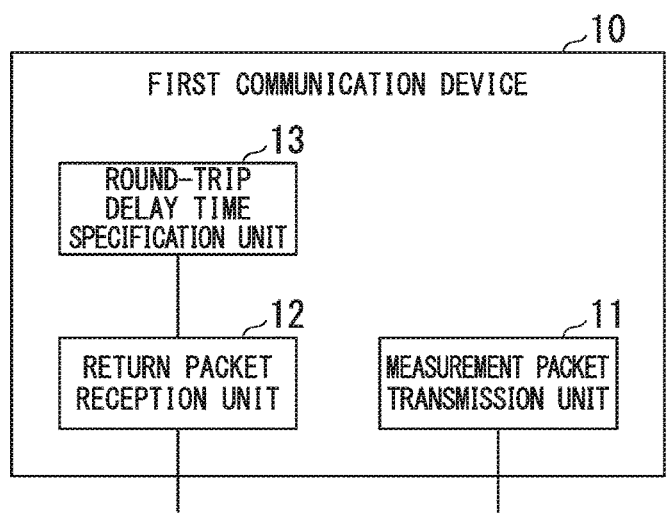
FIG. 2 is a schematic block diagram showing a basic configuration of a first communication device shown in FIG. 1.

FIG. 2 is a schematic block diagram showing a basic configuration of the first communication device 10.

The first communication device 10 includes a measurement packet transmission unit 11, a return, packet reception unit 12, and a round-trip delay time specification unit 13. There is a case where the round-trip delay time specification unit 13 is simply referred to as a delay time specification unit 13. The measurement packet transmission unit 11 transmits a measurement packet. The return packet reception unit 12 receives a packet representing a return packet that is transmitted as a reply to the measurement packet, which includes information relating to a processing time indicating the duration from a time point at which the measurement packet is received to a return time point at which the return packet of the measurement packet thereof is transmitted, and that has the same packet size as the measurement packet. The delay time specification unit 13 specifies, as a round-trip delay time, a duration in which the processing time is subtracted from the duration from a transmission time point of the measurement packet to a reception time point of the return packet of the measurement packet.

Figure 3:
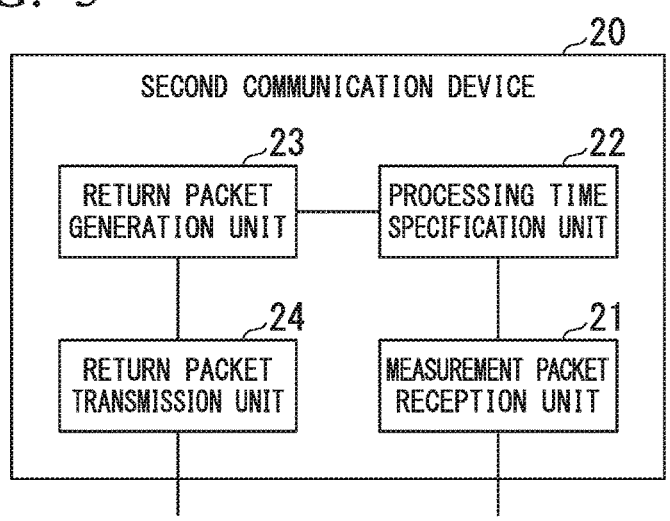
FIG. 3 is a schematic block diagram showing a basic configuration of a second communication device shown in FIG. 1.

FIG. 3 is a schematic block diagram showing a basic configuration of the second communication device 20.

The second communication device 20 includes a measurement packet reception unit 21, a processing time specification unit 22, a return packet generation unit 23, and a return packet transmission unit 24. The measurement packet reception unit 21 receives a measurement packet. The processing time specification unit 22 specifies information relating to a processing time indicating the duration from a time point at which the measurement packet is received to a return time point at which a return packet that is transmitted as a reply to the measurement packet thereof is transmitted. The return packet generation unit 23 generates the return packet of the measurement packet. The return packet transmission unit 24 transmits the return packet at a return time point.

Figure 4:
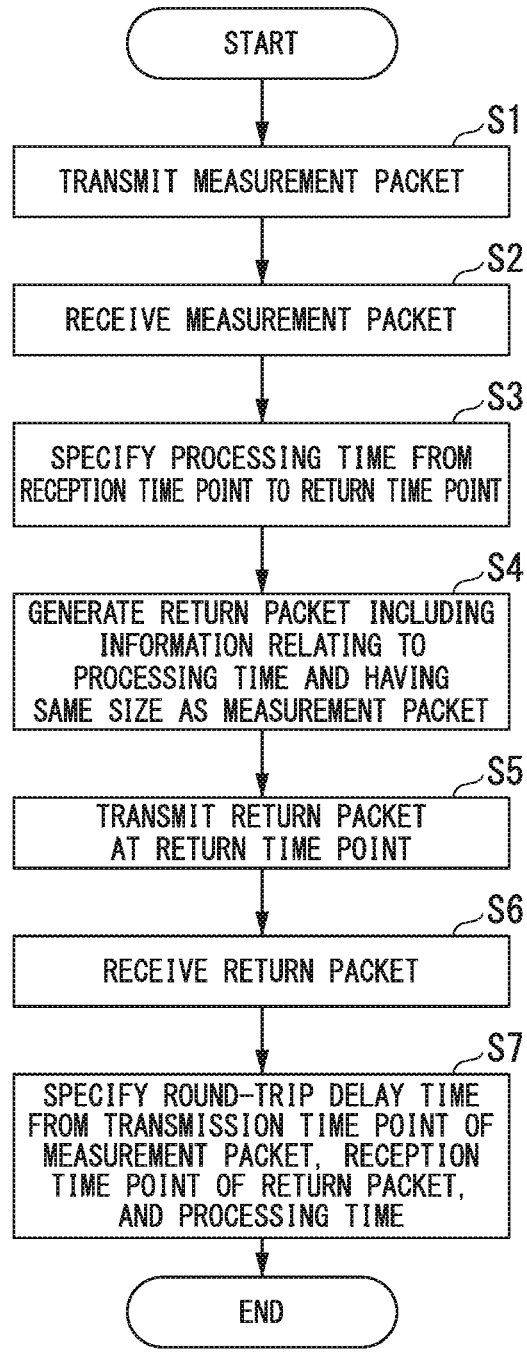
FIG. 4 is a flowchart showing a schematic procedure of a round-trip delay time measurement method according to the exemplary embodiment of the present invention.

FIG. 4 is a flowchart showing a schematic procedure of a round-trip delay time measurement method.

Firstly, the first communication device 10 transmits a measurement packet (step S1). Then, the second communication device 20 receives the measurement packet (step S2). Next, the second communication device 20 specifies information relating to a processing time indicating the duration from the time point at which the measurement packet is received to a return time point at which a return packet of the measurement packet thereof is transmitted (step S3). Then, the second communication device 20 generates a packet that represents a return packet of the measurement packet, that includes information relating to the processing time, and that has the same packet size as the measurement packet (step S4). Next, the second communication device 20 transmits the return packet at the return time point (step S5). Then, the first communication device 10 receives the return packet (step S6). Further, the first communication device 10 specifies, as a round-trip delay time, a duration in which the processing time is subtracted from the duration from the transmission time point of the measurement packet to the reception time point of the return packet that is transmitted as a reply to the measurement packet thereof (step S7).

In this manner, the return packet includes information relating to a processing time indicating the duration from the time point at which the measurement packet is received to the transmission time point of the return packet thereof, and the packet size of the return packet is equal to the packet size of the measurement packet. Consequently, the first communication device 10 is able to accurately determine the round-trip delay time.

First Exemplary Embodiment

Hereunder, an exemplary embodiment is described in detail with reference to the drawings.

Figure 5:
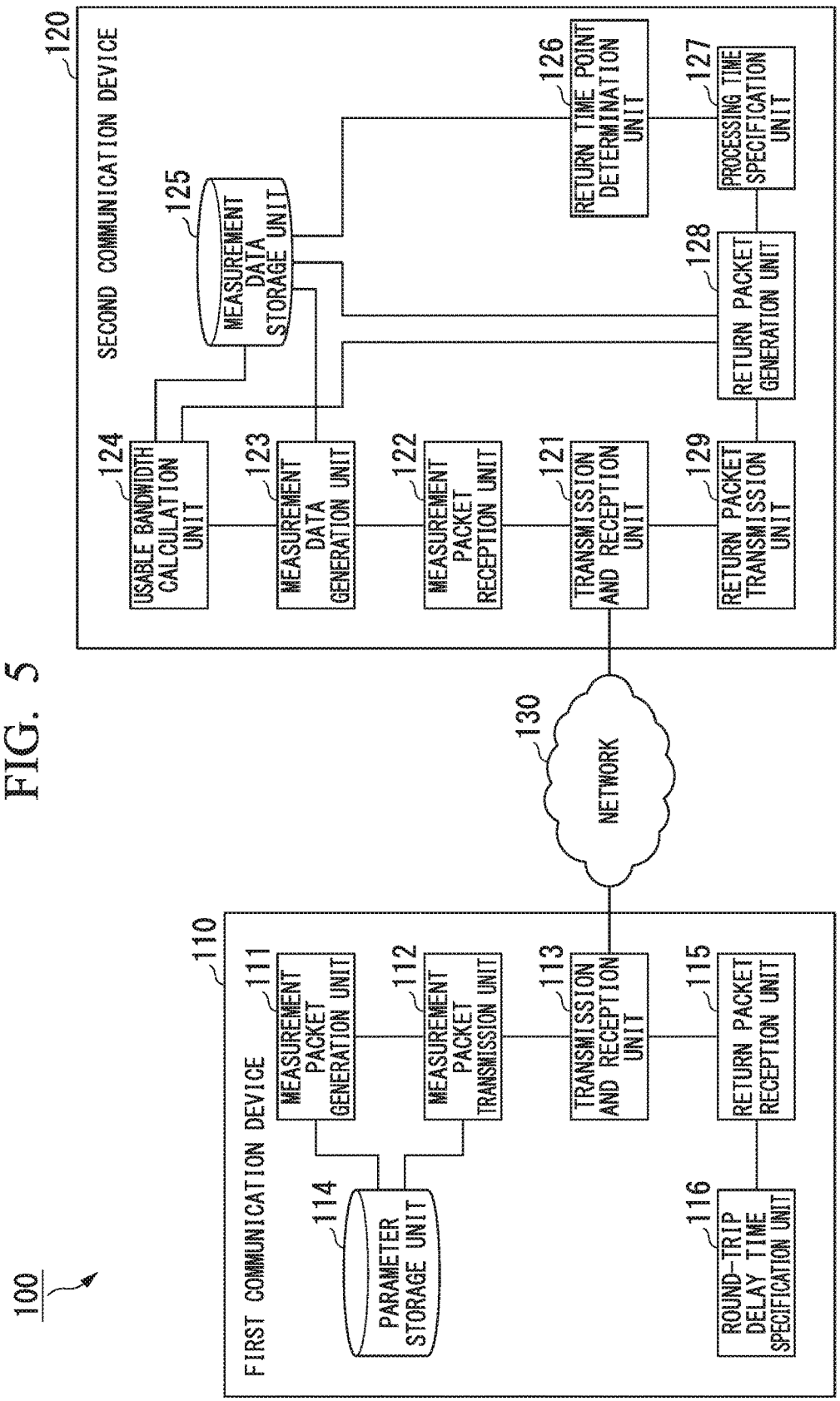
FIG. 5 is a diagram showing a network configuration of a quality state confirmation system according to a first exemplary embodiment of the present invention.

FIG. 5 represents a network configuration of a quality state confirmation system 100 according to a first exemplary embodiment. The quality state confirmation system 100 includes a first communication device 110 and a second communication device (external device) 120. The quality state confirmation system 100 is an example of a round-trip delay time measurement system.

The first communication device 110 and the second communication device 120 are connected via a network 130. The network 130 may have devices other than the first communication device 110 and the second communication device 120 that are not shown in the figure connected to it. Cross traffic may flow between the devices that are not shown in the figure.

The first communication device 110 and the second communication device 120 may be configured by a communication device such as personal computer (PC), a portable-type computer (Personal Digital Assistant (PDA)), a mobile phone, a smartphone, a landline phone, a street multimedia terminal, an in-car terminal, a television with a network connection function, set-top box with a network connection function, a gaming console, a printer with a network connection function, or a scanner with a network connection function.

The first communication device 110 includes a measurement packet generation unit 111, a measurement packet transmission unit 112, a transmission and reception unit 113, a parameter storage unit 114, a return packet reception unit 115, and a delay time specification unit 116. The second communication device 120 includes a transmission and reception unit 121, a measurement packet reception unit 122, a measurement data generation unit 123, a usable bandwidth calculation unit 124, a measurement data storage unit 125, a return time point determination unit 126, a processing time specification unit 127, a return packet generation unit 128, and a return packet transmission unit 129. There is a case where the usable bandwidth calculation unit 124 is simply referred to as a calculation unit 124. The respective functions of the units within the first communication device 110 and the second communication device 120 can be realized by a computer operating according to a predetermined program.

The measurement packet generation unit 111 of the first communication device 110 generates a plurality of measurement packets that are transmitted to the second communication device 120. The measurement packets generated by the measurement packet generation unit 111 are transmitted to the second communication device 120 as a packet train. The measurement packet generation unit 111 generates measurement packets whose packet size gradually increases from the head packet toward the final packet of the packet train. The transmission and reception unit 113 performs data transmission to the network 130 and data reception from the network 130. The measurement packet transmission unit 112 transmits measurement packets at a predetermined transmission interval via the transmission and reception unit 113.

The parameter storage unit 114 stores a minimum packet size, a packet increase size, and a measurement packet transmission interval. The measurement packet generation unit 111 refers to the parameter storage unit 114 and generates measurement packets that increase from the minimum packet size by the amount of the packet increase size. The measurement packet transmission unit 112 transmits the measurement packets at the transmission interval stored in the parameter storage unit 114.

The minimum packet size, the packet increase size, and the number of measurement packets configuring the packet train are set such that the packet size of the measurement packet configuring the final packet falls within a packet size range that is able to pass through the network 130. That is to say, the packet size of the measurement packets configuring the packet train are all set to a packet size that is able to pass through the network 130 and arrive at the second communication device 120.

The return packet reception unit 115 receives a return packet of the measurement packet via the transmission and reception unit 113. The delay time specification unit 116 specifies a round-trip delay time based on the return packet received by the return packet reception unit 115. More specifically, the delay time specification unit 116 specifies, as the round-trip delay time, a duration obtained by subtracting a processing time from the reception time point of the measurement packet that is firstly transmitted to the transmission time point of the return packet, from the duration from the transmission time point of the measurement packet that is firstly transmitted to the reception time point of the return packet.

The transmission and reception unit 121 of the second communication device 120 performs data transmission to the network 130 and data reception from the network 130. The measurement packet reception unit 122 receives measurement packets transmitted by the first communication device 110 via the transmission and reception unit 121. The measurement data generation unit 123 stores information (measurement data) relating to the received measurement packets in the measurement data storage unit 125. The measurement data stored by the measurement data generation unit 123 in the measurement data storage unit 125 includes a measurement packet reception interval of the measurement packets of the measurement packets, a transmission time point of the measurement packets, and a reception time point of the measurement packets. The measurement packet generation unit 111 is an example of a reception time point specification unit. The calculation unit 124 calculates a usable bandwidth based on the measurement data of the measurement packets received by the transmission and reception unit 121. More specifically, the calculation unit 124 compares the reception internal at the time of reception of the measurement packet and the transmission interval at the time of transmission of the measurement packet. The calculation unit 124 calculates the usable bandwidth using the measurement packet having the maximum packet size among measurement packets whose reception interval and transmission interval are equal. The calculation unit 124 stores the calculated usable bandwidth in the measurement data storage unit 125.

The return time point determination unit 126 determines a time point after the reception time point of the measurement packet that was lastly received that is stored in the measurement data storage unit 125, as the transmission time point (return time point) of the return packet of the measurement packet that was firstly received. The processing time specification unit 127 specifies the duration from the reception time point of the measurement packet that was firstly received that is stored in the measurement data storage unit 125, to the return tune point determined by the return time point determination unit 126, as the processing time taken to prepare the transmission of the return packet.

The return packet generation unit 128 generates a return packet of the measurement packet that was firstly received. The return packet generation unit 128 includes in the return packet, the transmission time point included in the measurement packet that was firstly received and the processing time specified by the processing time specification unit 127. At this time, the return packet generation unit 128 may further include in the return packet, the usable bandwidth calculated by the calculation unit 124. The return packet transmission unit 129 transmits the return packet generated by the return packet generation unit 128, at the return time point determined by the return time point determination unit 126.

Figure 6:
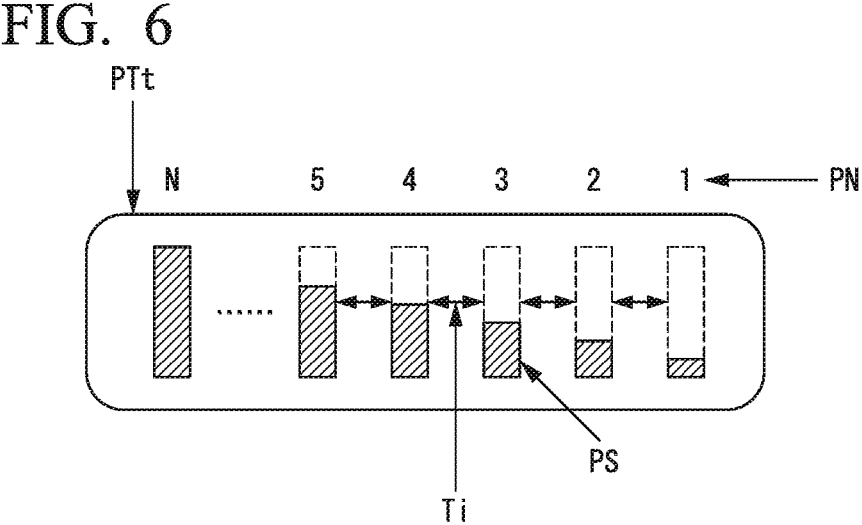
FIG. 6 is a diagram showing a transmission time packet train according to the first exemplary embodiment.

FIG. 6 is a diagram showing a transmission time packet train PTt. In FIG. 6, "PN" indicates a packet number. "PS" indicates a packet size. "Ti" indicates a transmission interval. The transmission time packet train PTt is a measurement packet train transmitted from the first communication device 110. In the example shown in FIG. 6, the number of measurement packets generated by the measurement packet generation unit 111 is N (where N is an integer of 3 or more). The packet number is a number for identifying a measurement packet. The transmission time packet train is configured by measurement packets that are arranged in a time series from packet number 1 to N. Examples of the measurement packets include an IP (Internet Protocol) packet, a UDP (User Datagram Protocol) packet, and a RTP (Real-time, Transport Protocol) packet.

In the transmission time packet train PTt, the transmission interval of the measurement packets is equal to the transmission interval stored by the parameter storage unit 114. That is to say, the time interval between adjacent measurement packets is equal. The packet size of the packet number 1 measurement packet is equal to the minimum packet size stored in the parameter storage unit 114. The packet size of the packet number 2 measurement packet is larger than the size of the packet number 1 measurement packet by the amount of the packet increase size stored by the parameter storage unit 114. Thereafter, each time the packet number increases by 1, the packet size of the measurement packet increases by the amount of the packet increase size. The measurement packet generation unit 111 includes with each measurement packet the packet number, the packet size, and the transmission interval.

Figure 7:
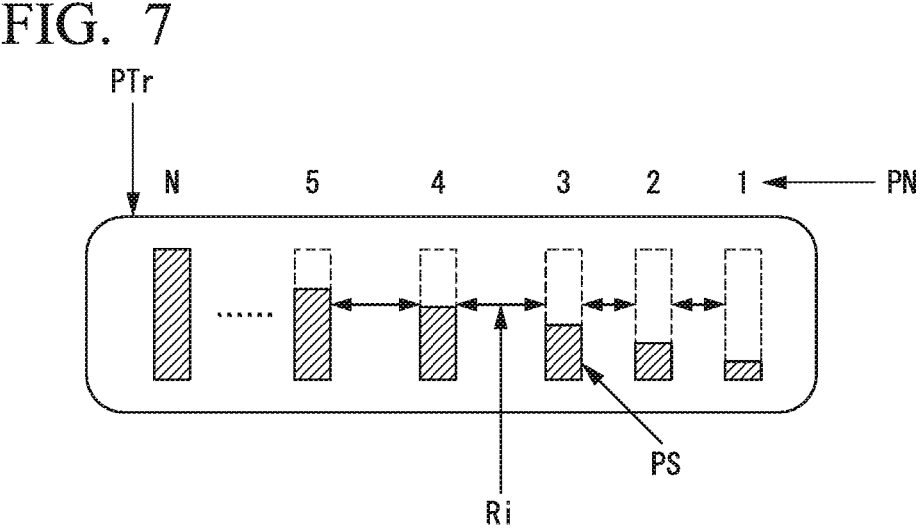
FIG. 7 is a diagram showing a reception time packet train according to the first exemplary embodiment.

FIG. 7 is a diagram showing a reception time packet train PTr. In FIG. 7, "PN" indicates a packet number. "PS" indicates a packet size. "Ri" indicates a reception interval. The reception time packet train PTr represents a measurement packet train received by the second communication device 120. The measurement packet is transmitted over the network 130 and received by the second communication device 120 as a reception time packet train PTr. In the reception time packet train PTr, the reception interval of the measurement packets is, until a certain point, equal to the transmission interval at the time of transmission of the measurement packets. However, as the packet size of the measurement packets increases, at a certain point, the reception interval of the measurement packets becomes larger than the transmission interval at the time of transmission.

When the reception interval of the measurement packets becomes larger than the transmission interval, the calculation unit 124 calculates a usable bandwidth using the measurement packet transmitted immediately prior to the measurement packet thereof. That is to say, when the reception interval between a certain measurement packet and the measurement packet transmitted immediately prior to the certain measurement packet thereof becomes larger than the transmission interval of the packets, the calculation unit 124 calculates the usable bandwidth using the measurement packet transmitted immediately prior to the certain measurement packet thereof. The packet size of the measurement packets successively increases. Consequently, the measurement packet transmitted immediately prior to the measurement packet in which the reception interval becomes larger than the transmission interval, corresponds to the measurement packet with the maximum packet size among measurement packets with the same reception interval and transmission interval. The calculation unit 124 calculates the usable bandwidth based on the packet size of the measurement packet transmitted immediately prior to the measurement packet in which the reception interval becomes larger than the transmission interval, and the transmission interval.

Figures 8, 9:
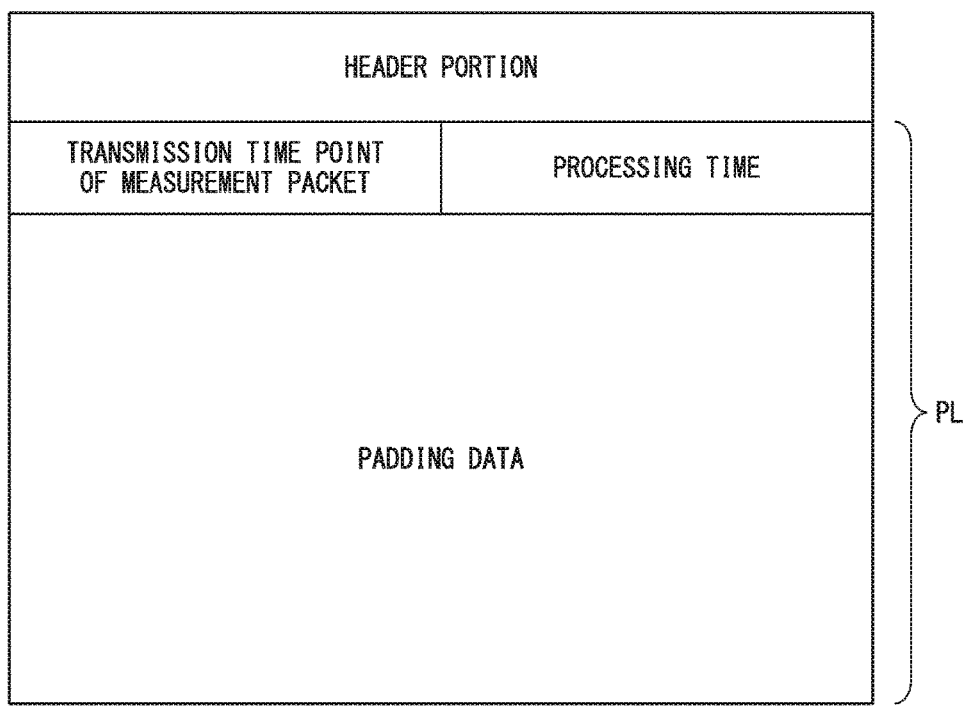
FIG. 8 is a diagram showing an example of measurement data of a measurement packet according to the first exemplary embodiment.
FIG. 9 is a diagram showing a data configuration of a return packet according to the first exemplary embodiment.

FIG. 8 is a diagram showing an example of measurement data of a measurement packet. The measurement data storage unit 125 stores measurement data in a configuration such as that shown in FIG. 8 for example. The measurement data storage unit 125 stores packet number, the packet size, the transmission interval the reception interval, the transmission tune point, and the reception time point of the measurement packets received by the transmission and reception unit 121. When the transmission and reception unit 121 receives a measurement packet, the measurement data generation unit 123 respectively stores the packet number, the packet size, the transmission interval, the transmission time point, and the reception time point included in the received measurement packet, in the packet number, the packet size, the transmission interval, the transmission time point, and the reception time point of the measurement data storage unit 125. Furthermore, the measurement data generation unit 123 calculates the reception interval of the measurement packet from the difference between the previous measurement packet reception time point and the current measurement packet reception time point, and stores the calculated reception interval in the reception interval of the measurement data storage unit 125.

For example, when the transmission and reception unit 121 receives a measurement packet with the packet number 3, the measurement data generation unit 123 respectively stores the packet number, the packet size, the transmission interval, the transmission time point, and the reception time point included in the measure packet thereof in the packet number, the packet size, the transmission interval, the transmission time point, and the reception time point of the measurement data storage unit 125 in the row of the packet number 3. Furthermore, the measurement data generation unit 123 calculates the reception interval of the measurement packet with the packet number 3, from the difference between the measurement packet reception time point of the packet number 2 and the measurement packet reception time point of the packet number 3, and stores the calculated reception interval in the reception interval of the measurement data storage unit 125 in the rose of the packet number 3.

FIG. 9 is a diagram showing a data configuration of a return packet according to the first exemplary embodiment. Examples of the return packet include an IP (Internet Protocol) packet, a UDP (User Datagram Protocol) packet, and a RTP (Real-time Transport Protocol) packet.

A return packet is configured by a header portion and a payload portion ("PL" in FIG. 9 indicates the payload portion). The header portion stores information including a transmission source, a transmission destination, a packet size, and information relating to other return packets. The size of the header of the measurement packet is the same as the return packet.

The payload portion is configured by the transmission point of the measurement packet included in the measurement packet, the processing time specified by the processing time specification unit 127, and padding data (dummy data). The padding data is data that is stored in order to match the packet size of the return packet with the packet size of the measurement packet. That is to say, the size of the padding data is equal to a size obtained by subtracting, from the payload length of the measurement packet, the size of the data indicating the transmission time point of the measurement packet thereof, and the size of the data indicating the processing time specified by the processing time specification unit 127. The padding data may be meaningless data (for example, data representing a row of "0" is acceptable). The return packet may include the usable bandwidth calculated by the calculation unit 124 in a portion of the padding data. In this case, the first communication device 110 is able to recognize the usable bandwidth of the network 130 by receiving the return packet.

Figure 10:
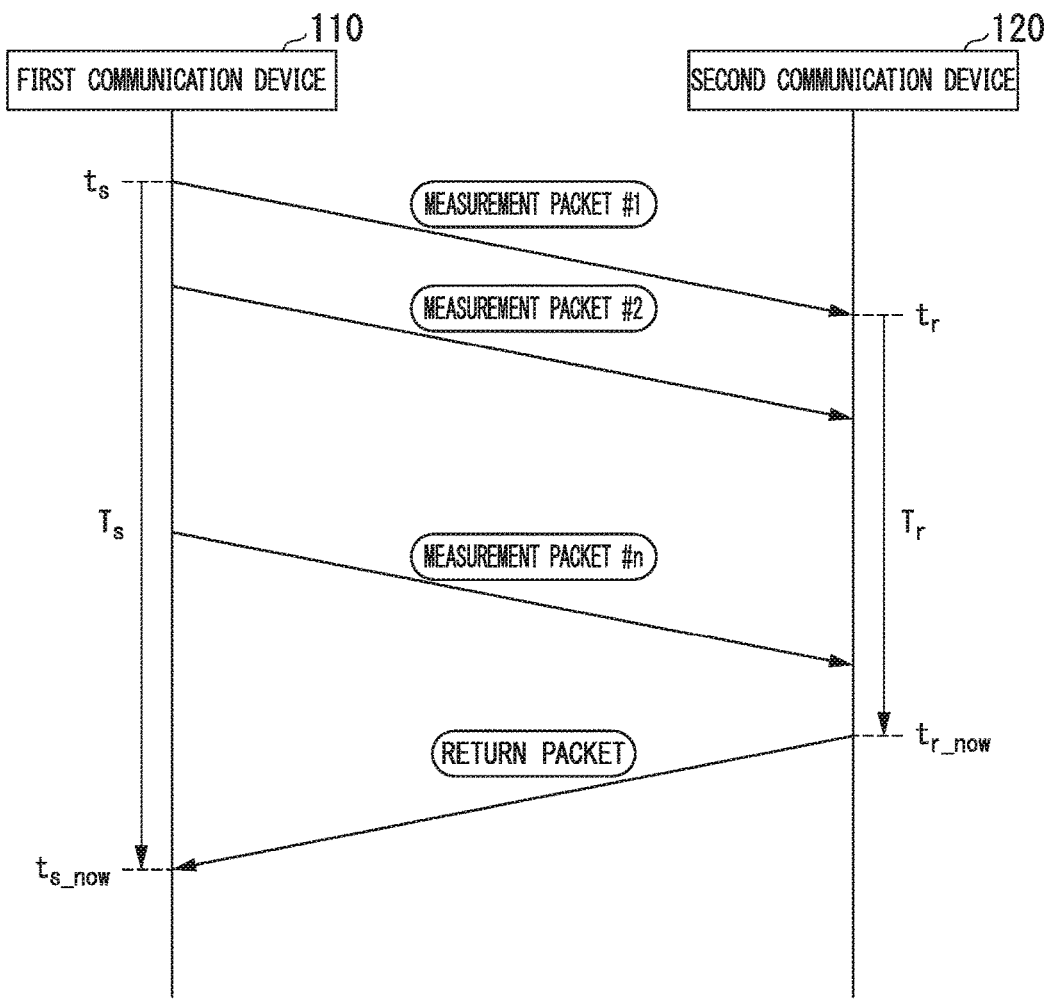
FIG. 10 is a diagram showing a transmission timing of a return packet according to the first exemplary embodiment.

FIG. 10 is a diagram showing a transmission timing of a return packet according to the first exemplary embodiment. The return packet represents a packet returned with respect to the measurement packet firstly transmitted by the first communication device 110. As mentioned above, the second communication device 120 transmits the return packet after it receives the measurement packet lastly transmitted by the first communication device 110. The duration from the transmission time point $t_s$ of the first measurement packet to the reception time point $t_{s\_now}$ of the return packet is represented by a duration $T_s$. The duration $T_s$ includes, in addition to the round-trip delay time of the network 130 due to the measurement packet and the return packet, a processing tune $T_r$ due to the second communication device 120 from the time point $t_r$ at which the first measurement packet is received to the time point $t_{r\_now}$ at which the return packet is transmitted. Therefore, the first communication device 110 is able to obtain a round-trip delay time that does not include the processing time due to the second communication device 120, by subtracting the duration $T_r$ from the duration $T_s$.

Figure 11:
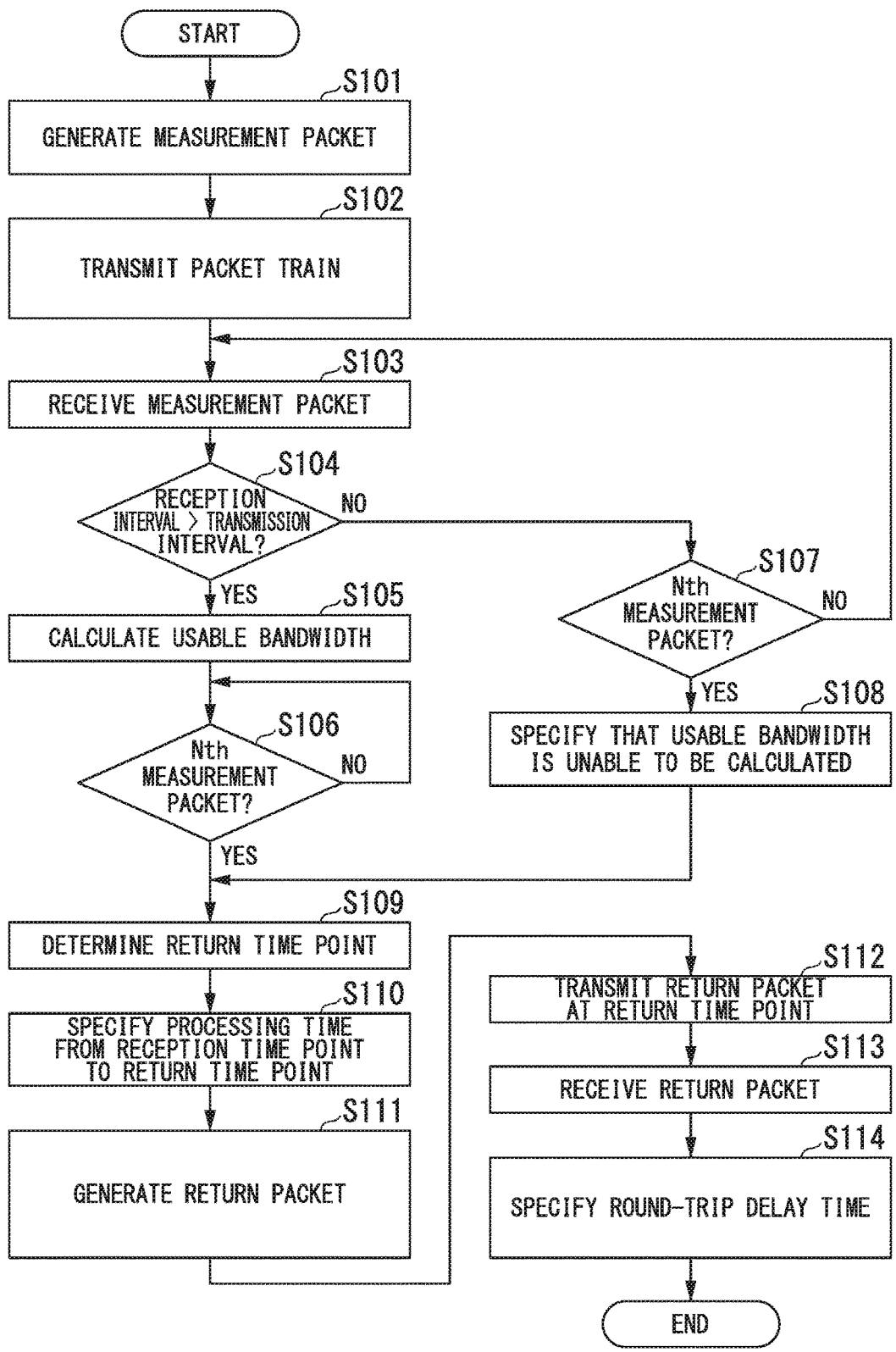
FIG. 11 is a flowchart showing an example of a quality state confirmation operation according to the first exemplary embodiment.

FIG. 11 is a flowchart showing an example of a quality state confirmation operation according to the first exemplary embodiment. The measurement packet generation unit 111 generates N measurement packets that configure a packet train (step S101). The measurement packet generation unit 111 sets the packet size of the packet number 1 measurement packet, which represents the head of the packet train, to the minimum packet size (the size of the packet having the smallest size) stored by the parameter storage unit 114. Each time the packet number increases by one, the measurement packet generation unit 111 increases the packet size of the measurement packet by the amount of the packet increase size stored by the parameter storage unit 114. More generally, the measurement packet generation unit 111 is such that the packet size of the ith (i=1, 2, 3, . . . , N) measurement packet is expressed by the following formula.

packet size=minimum packet size+(*i*−1)×packet increase size

The measurement packet generation unit 111 includes in each measurement packet the packet number, the packet size, the transmission time point, and the transmission interval stored by the parameter storage unit 114.

The measurement packet transmission unit 112 transmits via the transmission and reception unit 113, the measurement packets generated by the measurement packet generation unit 111 one at a time in sequence toward the second communication device 120 (step S102). At that time, the measurement packet transmission unit 112 transmits the measurement packets in sequence such that the interval between consecutive measurement packets becomes the transmission interval stored by the parameter storage unit 114. The measurement packet transmission unit 112 transmits the measurement packets at equal intervals according to the packet number, in a sequence of the packet number 1, the packet number 2, . . . , the packet number N, until the packet number N measurement packet. The measurement packets transmitted from the first communication device 110 pass through the network 130, and are received at the second communication device 120.

The measurement packet reception unit 122 of the second communication device 120 receives the measurement packets via the transmission and reception unit 121 (step S103).

When the measurement packet reception unit 122 receives a measurement packet, the measurement data generation unit 123 stores the packet number, the packet size, the transmission interval, and the transmission time point included in the received measurement packet, in the measurement data storage unit 125 (refer to FIG. 8). Furthermore, the measurement data generation unit 123 specifies the reception time point of the measurement packet, and stores it in the measurement data storage unit 125. Moreover, with respect to the second and later measurement packets, the measurement data generation unit 123 calculates as the reception interval, the difference between the reception time point of the measurement packet thereof and the reception time point of the previous measurement packet, and stores it in the measurement data storage unit 125. Each time the transmission and reception unit 121 receives a measurement packet, the calculation unit 124 evaluates the relative magnitudes of the reception interval of the measurement packet and the transmission interval included in the measurement packet (step S104).

In the transmission time packet train (refer to FIG. 6), since the size of the measurement packets gradually increases, the data quantity of the packets transmitted by the first communication device 110 toward the second communication device 120 per unit time gradually increases. When the data quantity per unit time increases and exceeds the usable bandwidth in the communication path from the first communication device 110 to the second communication device 120, the reception interval of the measurement packets received at the second communication device 120 becomes larger than the transmission interval at the time of transmission of the measurement packets. Therefore, if the calculation unit 124 determines in step S104 that the reception interval of the measurement packet is greater than the transmission interval (step S104: YES), it calculates the usable bandwidth based on the packet size of the measurement packet and the transmission interval (step S105).

More specifically, the calculation unit 124 calculates the usable bandwidth according to the following sequence in step S105. The calculation unit 124 firstly examines the packet number of the measurement packet for which the reception interval became larger than the transmission interval. The packet number at the point the reception interval became larger than the transmission interval is assumed to be represented by "j". Then, the calculation unit 124 acquires from the measurement data storage unit 125, the packet size and the transmission interval of the measurement packet whose packet number is j−1. Thereafter, the calculation unit 124 uses the following formula to calculate the usable bandwidth.

usable bandwidth=(packet size of *j*−1*th* measurement packet)/transmission interval Next, the second communication device 120 determines whether or not the packet number of the measurement packet is number N (step S106). If the second communication device 120 determines in step S106 that the measurement packet number is not number N (step S106: NO), it returns to step S103 and receives the next measurement packet.

On the other hand, if the calculation unit 124 determines in step S104 that the reception interval of the measurement packet is less than or equal to the transmission interval (step S104: NO), it determines whether or not the packet number of the measurement packet is number N (step S107). If the second communication device 120 determines in step S107 that the measurement packet number is not number N (step S107: NO), it returns to step S103 and receives the next measurement packet. On the other hand, if the calculation unit 124 determines in step S107 that the measurement packet number is number N (step S107: YES), that is to say, the received measurement packet is the final measurement packet of the packet train, it specifies that the usable bandwidth is unable to be calculated (step S108).

When the second communication device 120 receives the measurement packet whose pocket number is N (step S106: YES, step S107: YES), the return time point determination unit 126 determines a time point after the current time point, that is to say, a predetermined time point after the reception time point of the final measurement packet of the packet train, as the return time point at which the return packet is transmitted (step S109). For example, the return time point determination unit 126 determines as the return time point, a time point in which the duration required for the return packet generation unit 128 to generate a return packet is added to the current time point.

Then, the processing time specification unit 127 specifies as the processing time, the duration from the reception time point stored by the measurement data storage unit 125 in a state of being associated with the first measurement packet (refer to FIG. 8) to the return time point determined by the return time point determination unit 126 (step S110). Next, the return packet generation unit 128 generates a return packet including the transmission time point stored by the measurement data storage unit 125 in a state of being associated with the first measurement packet (refer to FIG. 8), the processing time specified by the processing time specification unit 127, and padding data (step S111). The return packet generation unit 128 reads out the packet size from the measurement data storage unit 125 (refer to FIG. 8), and specifies the size of the padding data by subtracting from the packet size thereof the size of the header portion, the size of the transmission time point of the measurement packet, and the size of the processing time. Furthermore, the return packet generation unit 128 makes a portion of the padding data include usable bandwidth information calculated by the calculation unit 124. The region of the usable bandwidth information stores the usable bandwidth calculated by the calculation unit 124 or information that the usable bandwidth is unable to be calculated.

The return packet transmission unit 129 transmits the return packet generated by the return packet generation unit 128, to the first communication device 110 via the transmission and reception unit 121 (step S112).

The measurement packet transmitted from the second communication device 120 passes through the network 130, and is received at the first communication device 110.

The return packet reception unit 115 of the first communication device 110 receives the return packet via the transmission and reception unit 113 (step S113). The delay time specification unit 116 specifies the round-trip delay based on the transmission time point of the measurement packet and the processing time included in the received packet, and the reception time point of the return packet thereof (step S114). More specifically, the delay time specification unit 116 specifies the reception time point of the received return packet, and calculates the duration from the transmission time point of the measurement packet included in the return packet to the reception time point thereof.

Then, the delay time specification unit 116 specifies the round-trip delay time by subtracting the processing time included in the return packet from the calculated duration. Furthermore, the first communication device 110 is able to recognize the usable bandwidth of the network 130 by means of the usable bandwidth information included in the padding data of the return packet.

In the present exemplary embodiment, the return packet includes information relating to the processing time indicating the duration from the time point at which the measurement packet is received to the transmission time point of the return packet thereof. Further, the packet size of the return packet is equal to the packet size of the measurement packet. Consequently, the first communication device 110 is able to accurately measure the round-trip delay time.

Moreover, in the present exemplary embodiment, as a result of the return packet including usable bandwidth information, a packet for measuring the round-trip delay time also serves as a packet for notifying the usable bandwidth transmitted by the second communication device 120. Consequently, the quality state confirmation system 100 is able to make the first communication device 110 recognize the usable bandwidth of the network 130 and the round-trip delay time, with a small number of communications. Furthermore, in the present exemplary embodiment the timing in which the return packet is generated is after calculation of the usable bandwidth by the calculation unit 124. As a result, the second communication device 120 is such that generation of the return packet can be made to not exert an influence on the confirmation of the usable bandwidth.

The foregoing has described in detail an exemplary embodiment of the present invention with reference to the drawings. However, specific configurations are in no way limited to the exemplary embodiment mentioned above, and various design changes, and the like, are possible.

For example, in the exemplary embodiment mentioned above, the quality state confirmation system 100 specifies the round-trip delay time based on the return packet of the first measurement packet. However, the exemplary embodiment of the present invention is in no way limited to this. For example, in another exemplary embodiment, the second communication device 120 may transmit to the first communication device 110 a return packet of another measurement packet (a measurement packet other than the first measurement packet), such as the final measurement packet.

The packet train according to the exemplary embodiment mentioned above includes a plurality of measurement packets whose packet size successively increases. However, the exemplary embodiment of the present invention is in no way limited to this. For example, the packet train according to another exemplary embodiment may be configured by a plurality of measurement packets whose packet size successively decreases.

In the exemplary embodiment mentioned above, the quality state confirmation system 100 specifies the usable bandwidth of the network 130 and the round-trip delay time. However, the exemplary embodiment of the present invention is in no way limited to this. For example, the quality state confirmation system 100 according to another exemplary embodiment may not specify the usable bandwidth of the network 130, and specify only the round-trip delay time. In this case, the first communication device 110 may not transmit the measurement packet as a packet train.

In the exemplary embodiment mentioned above, a case was described where the return packet stores the processing time ($T_r$ in FIG. 10) as information relating to the processing time. However, the exemplary embodiment of the present invention is in no way limited to this. For example, in another exemplary embodiment, the return packet may store a combination of the reception time point of the measurement packet ($t_r$ in FIG. 10) and the transmission time point of the return packet ($t_{r\_now}$ in FIG. 10) as information relating to the processing time.

In the exemplary embodiment mentioned above, a case was described where the return packet stores the transmission time point of the measurement packet. However, the exemplary embodiment of the present invention is in no way limited to this. For example, in another exemplary embodiment, if the first communication device 110 stores the transmission time point of the respective measurement packets, it is possible for the first communication device 110 to calculate the round-trip delay time as a result of the return packet storing the measurement packet number, in place of the transmission time point of the measurement packet. Furthermore, in a case where it is determined beforehand a certain return packet is a reply to which one of the measurement packets, the return packet of the certain return packet may not store the measurement packet number.

Figure 12:
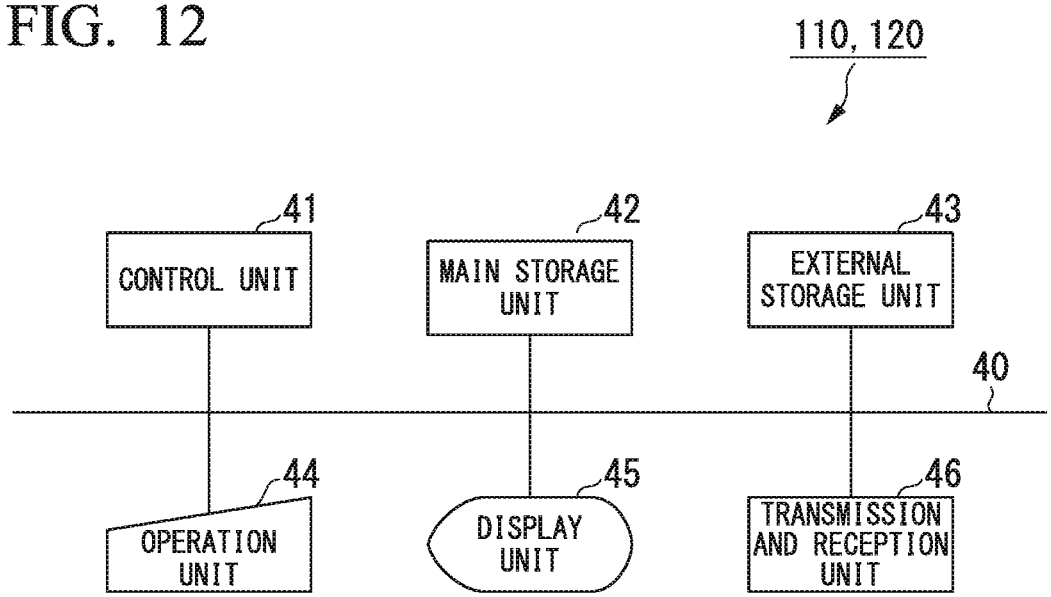
FIG. 12 is a block diagram showing an example of a physical configuration of a first communication device and a second communication device according to at least one exemplary embodiment of the present invention.

FIG. 12 is a block diagram showing an example of a physical configuration of the first communication device 110 and the second communication device 120 according to at least one of the exemplary embodiments.

The first communication device 110 and the second communication device 120 include, as shown in FIG. 12, a control unit 41, a primary storage unit 42, an external storage unit 43, an operation unit 44, a display unit 45 a transmission and reception unit 46. The primary storage unit 42, the external storage unit 43, the operation unit 44, the display unit 45, and the transmission and reception unit 46 are each connected to the control unit 41 via an internal bus 40.

The control unit 41 is configured by a CPU (Central Processing Unit) and the like. The control unit 41 executes processing for a delay time specification or a usable bandwidth measurement according to a control program stored in the external storage unit 43. The primary storage unit 42 is configured by a RAM (Random Access Memory) the like. The primary storage unit 42 loads the control program stored in the external storage unit 43, and is used as a working region of the control unit 41.

The external storage unit 43 is configured by a non-volatile memory such as a flash memory, a hard disk, a DVD-RAM (Digital Versatile Disc Random-Access Memory), or a DVD-RW (Digital Versatile Disc ReWritable). The external storage unit 43 stores beforehand the control program for making the control unit 41 perform the processing mentioned above. Furthermore, according to an instruction from the control unit 41, it supplies data stored in the control program to the control unit 41, and stores data supplied from the control unit 41.

The operation unit 44 is configured by a pointing device and the like, such as a keyboard and mouse, and an interface device that connects the pointing device and the like to the internal bus 40. The address of a partner device in which a delay time specification or a usable bandwidth measurement is performed, an initial value and increase amount of the packet size of the measurement packets, and the like, are input via the operation unit 44 and supplied to the control unit 41.

The display unit 45 is configured by a CRT (Cathode Ray Tube) an LCD (Liquid Crystal Display), and the like. The display unit 45 displays the result of a delay time specification or a usable bandwidth measurement, and the like.

The transmission and reception unit 46 is configured by a wireless transceiver, a wireless modem or a network termination device, and a serial interface or a LAN (Local Area Network) interface that connects with them. The first communication device 110 and the second communication device 120 connect to an IP network via the transmission and reception unit 46, and perform mutual communication.

In addition, the hardware configuration and the flowchart described above are an example, and arbitrary modifications and corrections are possible.

The section that becomes the of performing control operations, which is configured by the control unit 41, the primary storage unit 42, the external storage unit 43, the transmission and reception unit 46, and the internal bus 40, is realizable using a conventional computer system without a dedicated system. For example, the first communication device 110 or the second communication device 120 that execute the processing described above may be configured by storing the computer program for executing the operation described above on a computer-readable recording medium (such as a flexible disk, a CD-ROM, or a DVD-ROM), distributing it, and installing the computer program thereof on a computer. Furthermore, the first communication device 110 or the second communication device 120 may be configured by storing the computer program thereof beforehand on a storage device provided to a server device on a communication network, such as the Internet, and then having a conventional computer system perform a download, and the like.

Moreover, in a case where the functions of the first communication device 110 or the second communication device 120 are realized by division between an OS (operating system) and an application program, or by cooperation between an OS and an application program for example, the application program section alone may be stored on a recording medium or in a storage device.

Furthermore, it is possible to superimpose the computer program on a carrier wave, and then transmit it via a communication network. For example, the computer program described above may be posted on a bulletin board (BBS: Bulletin Board System) on a communication network, and then the computer program described above may be transmitted via a network. Further, acceptable is a configuration that is able to execute the processing described above by starting-up the computer program and executing it under the control of an OS in the same manner as another application program.

The foregoing has described the present invention with reference to the exemplary embodiment, although the present invention is in no way limited to the exemplary embodiment described above. It would be understood by those skilled in the art that various changes to the configurations and details may be made without departing from the scope of the invention as defined by the claims.

The whole or a part of the exemplary embodiment above may also be described by the following supplementary notes. However, it is in no way limited to the following.

(Supplementary Note 1)

A round-trip delay time measurement system including a first communication device and a second communication device, wherein the first communication device includes:

a measurement packet transmission unit that transmits a measurement packet at a first transmission time point;

a return packet reception unit that receives a reply packet at a second reception time point, the reply packet including information relating to a processing time indicating a duration from a first reception time point to a second transmission time point reply packet having a same packet size as the measurement packet; and a delay tinge specification unit that specifies, as a round-trip delay time, a duration obtained by subtracting the processing time from a duration from the first transmission time point to the second reception time point, and the second communication device includes:

a measurement packet reception unit that receives the measurement packet at the first reception time point;

a processing time specification unit that specifies the information relating to the processing time;

a return packet generation unit that generates the return packet; and a return packet transmission unit that transmits, at the second transmission time point, the return packet as a reply to the measurement packet.

(Supplementary Note 2)

The round-trip delay time measurement system according to supplementary note 1, wherein the measurement packet transmission device transmits a plurality of measurement packets whose packet size sequentially increases or decreases, and the second communication device includes a calculation unit that compares the transmission interval of the plurality of measurement packets and the reception interval of the measurement packet, and calculates a usable bandwidth using a measurement packet with a maximum packet size among measurement packets whose transmission interval and reception interval are equal.

(Supplementary Note 3)

The round-trip delay time measurement system according to supplementary note 2, wherein the second communication device includes a return time point determination unit that determines, as a return time point which represents a time point at which the return packet is transmitted, a time point beyond the time point at which the final measurement packet of the plurality of measurement packets is received.

(Supplementary Note 4)

The round-trip delay time measurement system according to supplementary note 2 or supplementary note 3, wherein the return packet generation unit generates the packet including a usable bandwidth calculated by the calculation unit.

(Supplementary Note 5)

A round-trip delay time measurement method including:

transmitting a measurement packet at a first transmission time point;

receiving the measurement packet at a first reception time point;

specifying information relating to a processing time indicating a duration from the first reception time point to a second transmission time point;

generating a reply packet that includes the information relating to the processing time and has a same packet size as the measurement packet;

transmitting, at the second transmission time point, the return packet as a reply to the measurement packet;

receiving the return packet at a second reception time point; and specifying, as a round-trip delay, a duration in which the processing time is subtracted from a duration from the first transmission time point to the second reception time point.

(Supplementary Note 6)

A communication device that performs communication with an external device, the communication device including:

a measurement packet transmission unit that transmits a measurement packet at a first transmission time point;

a return packet reception unit that receives a return packet at a second reception time point, the return packet being transmitted as a reply to the measurement packet at a second transmission time point by the external device, the return packet including information relating to a processing time indicating a duration from a first reception time point at which the measurement packet is received by the external device, to the second transmission time point, the return packet having a same packet size as the measurement packet; and a delay time specification unit that specifies, as a round-trip delay time, a duration obtained by subtracting the processing time from a duration from the first transmission time point to the second reception time point.

(Supplementary Note 7)

A round-trip delay time measurement method including:

transmitting a measurement packet at a first transmission time point;

receiving a reply packet at a second reception time point, the reply packet being transmitted as a reply to the measurement packet at a second transmission time point, the replay packet including information relating to a processing time indicating a duration from a first reception time point at which the measurement packet is received, to the second transmission time point, the reply packet having a same packet size as the measurement packet; and specifying, as a round-trip delay time, a duration obtained by subtracting the processing time from a duration from first transmission time point to the second reception time point.

(Supplementary Note 8)

A program that causes a computer to execute:

transmitting a measurement packet at a first transmission time point;

receiving the measurement packet at a first reception time point;

specifying information relating to a processing time indicating a duration from the first reception time point to a second transmission time point;

generating a reply packet that includes the information relating to the processing time and has a same packet size as the measurement packet;

transmitting, at the second transmission time point, the return packet as a reply to the measurement packet;

receiving the return packet at a second reception time point; and specifying, as a round-trip delay time, a duration in which the processing time is subtracted from a duration from the first transmission time point to the second reception time point.

(Supplementary Note 9)

A communication device including:

a measurement packet reception t receives, at a first reception time point, a measurement packet used for calculating a round-trip delay time;

a processing time specification unit that specifies information relating to a processing time indicating a duration from the first reception time point to a transmission time point;

a return packet generation unit that generates a reply packet, the reply packet including the information relating to the processing time and having a same packet size as the measure packet; and a return packet transmission unit that transmits, at the transmission time point, the return packet as a reply to the measurement packet.

(Supplementary Note 10)

A return method including:

receiving, at a first reception time point, a measurement packet used for calculating a round-trip delay time;

specifying information relating to a processing time indicating a duration from the first reception time point to a transmission time point;

generating a reply packet, the reply packet including the information relating to the processing and having a same packet size as the measurement packet; and transmitting, at the transmission time point, the return packet as a reply to the measurement packet.

(Supplementary dote 11)

A program that causes a computer to execute:

receiving, at a first reception time point, a measurement packet used for calculating round-trip delay time:

specifying information relating to a processing time indicating a duration from the first reception time point to a transmission time point;

generating a reply packet, the reply packet including the information relating to the processing time and having a same packet size as the measurement packet; and transmitting, at the transmission time point, the return packet as a reply to the measurement packet.

(Supplementary Note 10)

A data structure including information relating to a processing time indicating a duration from a time point at which a measurement packet used for calculating a round-trip delay time is received, to a time point at which a return packet used as a reply to the measurement packet is transmitted, the data structure having a same packet size as the measurement packet.

(Supplementary Note 13)

A data structure comprising a payload portion, the payload portion comprising:

information relating to a time point at which a measurement packet used for calculating a round-trip delay time is transmitted;

information relating to a processing time indicating a duration from a time point at which the measurement packet is received to a time point at which a return packet used as a reply to the measurement packet is transmitted; and padding data having a same size as a size obtained by subtracting, from a payload length of the measurement packet, a size of information relating to the time point at which the return packet is transmitted, and a size of information relating to the processing time.

This application is based upon and claims the benefit of priority from Japanese patent application No. 2014-234691, filed Nov. 19, 2014, the disclosure of which is incorporated herein in its entirety by reference.

INDUSTRIAL APPLICABILITY

The present invention may be applied to a round-trip delay time measurement system, a round-trip delay time measurement method, a return method, a communication device, a program, and a data structure.

REFERENCE SYMBOLS

1 Round-trip delay time measurement system
100 Quality state confirmation system
10, 110 First communication device
11, 112 Measurement packet transmission unit
12, 115 Return packet reception unit
13, 116 Round-trip delay time specification unit
20, 120 Second communication device
21, 122 Measurement packet reception unit
22, 127 Processing time specification unit
23, 128 Return packet generation unit
24, 129 Return packet transmission unit
30, 130 Network

The invention claimed is:

1. A round-trip delay time measurement system comprising a first communication device and a second communication device,
    wherein the first communication device comprises:
    a first memory that stores a first program; and
    a first processor that executes the first program;
    wherein the first processor is configured to:
        transmit a specific measurement packet which is one of a plurality of measurement packets at a first transmission time point;
        receive a return packet at a second reception time point, the return packet including information relating to a processing time indicating a duration from a first reception time point to a second transmission time point, the return packet having a same packet size as the specific measurement packet; and
        specify, as a round-trip delay time, a duration obtained by subtracting the processing time from a duration from the first transmission time point to the second reception time point, and
    the second communication device comprises:
    a second memory that stores a second program; and
    a second processor that executes the second program;
    wherein the second processor is configured to:
        receive the plurality of measurement packets, and receive the specific measurement packet at the first reception time point in the reception of the plurality of measurement packets;
        determine, as the second transmission time point, a time point after a reception time point of a measurement packet that was lastly received among the plurality of measurement packets;
        specify the information relating to the processing time on a basis of the determined second transmission time point;
        generate the return packet; and
        transmit, at the determined second transmission time point, the return packet as a reply to the specific measurement packet.

2. The round-trip delay time measurement system according to claim 1,
    wherein the first processor is configured to transmit the plurality of measurement packets whose packet size sequentially increases or decreases, and
    wherein the second processor is further configured to compare a transmission interval of the plurality of measurement packets and a reception interval of the measurement packet, and calculate a usable bandwidth using a measurement packet with a maximum packet size among measurement packets whose the transmission interval and the reception interval are equal.

3. The round-trip delay time measurement system according to claim 2,
    wherein the second processor is configured to determine, as the second transmission time point, the time point beyond a time point at which a final measurement packet of the plurality of measurement packets is received.

4. The round-trip delay time measurement system according to claim 2 or 3,
    wherein the second processor is configure to generate the return packet including the calculated usable bandwidth.

5. A round-trip delay time measurement method comprising:
- transmitting a specific measurement packet which is one of a plurality of measurement packets at a first transmission time point;
- receiving the plurality of measurement packets, and receiving the specific measurement packet at a first reception time point in the reception of the plurality of measurement packets;
- determining, as a second transmission time point, a time point after a reception time point of a measurement packet that was lastly received among the plurality of measurement packets;
- specifying information relating to a processing time indicating a duration from the first reception time point to the second transmission time point on a basis of the determined second transmission time point;
- generating a return packet that includes the information relating to the processing time and has a same packet size as the specific measurement packet;
- transmitting, at the determined second transmission time point, the return packet as a reply to the specific measurement packet;
- receiving the return packet at a second reception time point; and
- specifying, as a round-trip delay time, a duration obtained by subtracting the processing time from a duration from the first transmission time point to the second reception time point.

6. A communication device that performs communication with an external device, the communication device comprising:
- a first memory that stores a first program; and
- a first processor that executes the first program;
- wherein the first processor is configured to:
  - transmit a specific measurement packet which is one of a plurality of measurement packets at a first transmission time point;
  - receive a return packet at a second reception time point, the return packet being transmitted as a reply to the specific measurement packet at a second transmission time point by the external device, the return packet including information relating to a processing time indicating a duration from a first reception time point at which the specific measurement packet is received by the external device, to the second transmission time point, the return packet having a same packet size as the specific measurement packet, the second transmission time point being determined according to a time point after a reception time point of a measurement packet that was lastly received among the plurality of measurement packets by the external device; and
  - specify, as a round-trip delay time, a duration obtained by subtracting the processing time from a duration from the first transmission time point to the second reception time point.

\* \* \* \* \*

UNITED STATES PATENT AND TRADEMARK OFFICE
CERTIFICATE OF CORRECTION

PATENT NO. : 10,230,606 B2
APPLICATION NO. : 15/524085
DATED : March 12, 2019
INVENTOR(S) : Motohiro Suzuki and Kanako Anetai It is certified that error appears in the above-identified patent and that said Letters Patent is hereby corrected as shown below:

In the Specification

Column 2, Summary of the Invention, Line 9; Delete "tune" and insert --time-- therefor Column 2, Summary of the Invention, Line 18; Delete "tune" and insert --time-- therefor Column 2, Summary of the Invention, Line 61, (Second Occurrence); After "from", insert --the--

Column 3, Summary of the Invention, Line 15; Delete "tune" and insert --time-- therefor Column 4, Summary of the Invention, Line 45; Delete "tune" and insert --time-- therefor Column 4, Summary of the Invention, Line 47; Delete "tune" and insert --time-- therefor Column 5, Description of the Drawings, Line 1; Before "DESCRIPTION", insert --BRIEF--

Column 5, Embodiments for Carrying Out the Invention, Line 53; Delete "return," and insert --return-- therefor Column 8, Embodiments for Carrying Out the Invention, Line 30; Delete "internal" and insert --interval-- therefor Column 8, Embodiments for Carrying Out the Invention, Line 48; Delete "tune" and insert --time-- therefor Column 9, Embodiments for Carrying Out the Invention, Lines 9-10; Delete "(Real-time," and insert --(Real-time-- therefor Column 10, Embodiments for Carrying Out the Invention, Line 2; Before "packet", insert --the--

Signed and Sealed this
Thirtieth Day of July, 2019

Andrei Iancu
*Director of the United States Patent and Trademark Office*

CERTIFICATE OF CORRECTION (continued)
U.S. Pat. No. 10,230,606 B2

Column 10, Embodiments for Carrying Out the Invention, Line 3; After "interval", insert --,--

Column 10, Embodiments for Carrying Out the Invention, Line 4; Delete "tune" and insert --time-- therefor Column 10, Embodiments for Carrying Out the Invention, Line 27; Delete "measure" and insert --measurement-- therefor Column 10, Embodiments for Carrying Out the Invention, Line 38; Delete "rose" and insert --row-- therefor Column 10, Embodiments for Carrying Out the Invention, Line 52; After "transmission", insert --time--

Column 11, Embodiments for Carrying Out the Invention, Line 17; Delete "tune" and insert --time-- therefor Column 13, Embodiments for Carrying Out the Invention, Line 55; Before "based", insert --time--

Column 13, Embodiments for Carrying Out the Invention, Line 57; Before "packet,", insert --return--

Column 15, Embodiments for Carrying Out the Invention, Line 26; Delete "45" and insert --45, and-- therefor Column 15, Embodiments for Carrying Out the Invention, Line 36; After "Memory)", insert --and--

Column 15, Embodiments for Carrying Out the Invention, Line 60; After "Tube)", insert --,--

Column 16, Embodiments for Carrying Out the Invention, Line 6; After "the", insert --center--

Column 16, Embodiments for Carrying Out the Invention, Line 64; After "point", insert --, the--

Column 16, Embodiments for Carrying Out the Invention, Line 66; Delete "tinge" and insert --time-- therefor Column 17, Embodiments for Carrying Out the Invention, Line 37, (Second Occurrence); After "the", insert --return--

Column 17, Embodiments for Carrying Out the Invention, Line 56; Delete "delay," and insert --delay time,-- therefor Column 18, Embodiments for Carrying Out the Invention, Line 50; Delete "t" and insert --unit that-- therefor Column 18, Embodiments for Carrying Out the Invention, Line 60; Delete "measure" and insert --measurement-- therefor

CERTIFICATE OF CORRECTION (continued)
U.S. Pat. No. 10,230,606 B2

Column 19, Embodiments for Carrying Out the Invention, Line 5; After "processing", insert --time--

Column 19, Embodiments for Carrying Out the Invention, Line 9; Delete "dote" and insert --Note-- therefor Column 19, Embodiments for Carrying Out the Invention, Line 12; After "calculating", insert --a--

Column 19, Embodiments for Carrying Out the Invention, Line 21; Delete "10)" and insert --12)-- therefor